United States Patent [19]
Stempin et al.

[11] Patent Number: 5,554,464
[45] Date of Patent: Sep. 10, 1996

[54] HONEYCOMB BATTERY SEPARATOR

[75] Inventors: John L. Stempin, Beaver Dams; Ronald L. Stewart, Big Flats; Dale R. Wexell, Corning, all of N.Y.

[73] Assignee: Corning Incorporated, Corning, N.Y.

[21] Appl. No.: 506,713

[22] Filed: Jul. 26, 1995

[51] Int. Cl.⁶ .................................................. H01M 2/14
[52] U.S. Cl. ..................... 429/247; 429/129; 429/147; 429/246; 29/623.1
[58] Field of Search ................................ 429/129, 139, 429/145, 246, 247, 146, 147; 29/623.1

[56] References Cited

U.S. PATENT DOCUMENTS

| | | |
|---|---|---|
| Re. 15,067 | 3/1921 | Baird et al. . |
| 3,379,570 | 4/1968 | Berger et al. . |
| 3,446,668 | 5/1969 | Arrance et al. . |
| 3,446,669 | 5/1969 | Arrance et al. . |
| 3,489,610 | 1/1970 | Berger et al. . |
| 3,607,403 | 9/1971 | Arrance . |
| 3,647,542 | 3/1972 | Berger . |
| 3,661,644 | 5/1972 | Arrance . |
| 3,885,977 | 5/1975 | Lachman et al. . |
| 3,905,743 | 9/1975 | Bagley . |
| 4,160,068 | 7/1979 | Kummer ................................ 429/82 |
| 4,279,974 | 7/1981 | Nishii ................................... 429/104 |
| 4,948,477 | 8/1990 | Gibson et al. ......................... 204/129 |
| 5,208,121 | 5/1993 | Yahnke et al. . |
| 5,342,709 | 8/1994 | Yahnke et al. . |

FOREIGN PATENT DOCUMENTS 042155  7/1968  Japan .

Primary Examiner—M. Nuzzolillo
Attorney, Agent, or Firm—Milton M. Peterson

[57] ABSTRACT

An elongated, rigid, porous, ceramic separator for a rechargeable battery assembly, the separator having a honeycomb structure in which open cells are separated from adjacent cells by thin, porous, ceramic walls, the open cells and separating walls running lengthwise of the honeycomb, the cell walls being porous and the open cells and wall pores being adapted to be filled with an electrolyte to permit ion flow between electrodes in a battery.

17 Claims, 3 Drawing Sheets

HONEYCOMB BATTERY SEPARATOR

RELATED APPLICATION

An application entitled BATTERY SEPARATOR, filed Jun. 19, 1995 under Ser. No. 08/491,766 in the names of J. L. Stempin, R. L. Stewart and D. R. Wexell, and assigned to the same assignee as this application. That application is directed to a rigid, porous, ceramic battery separator having a porosity of 40–90%, a pore size of 0.1–25 microns, a thickness of 1–12 mm and resistance to acid attack.

1. Field of the Invention

Separators of honeycomb structure for a metal-electrolyte-metal battery.

2. Background of the Invention

The oldest and best known type of rechargeable battery is that known as the lead-acid battery. While the present invention is not so limited, it has been developed as an improved lead-acid type battery. Accordingly, the description is primarily in terms of such a battery.

A typical lead-acid battery comprises a positive electrode, a negative electrode, one or more separators, and an electrolyte. The electrodes function both as electrical contacts and as mechanical load-bearing elements. Each electrode is formed by coating a lead or lead alloy grid with an active paste material. The paste dries to form a porous layer of the active material as part of each electrode.

A separator may be any porous, perforated, or fibrous sheet that sufficiently isolates the electrodes to prevent short circuiting. However, the separator must also be sufficiently open to permit ion transfer through the electrolyte contained in the separator. Perforated plastic, or glass fiber, sheets are commonly used as separators. A compressed mat of glass fibers is currently used in many commercial storage batteries.

Porous earthenware and sintered silicate sheets have also been proposed. However, they have not been adapted commercially to any significant extent. One problem has been lack of sufficient porosity to permit proper operation of a battery.

The electrolyte may be any ionizable liquid that can provide ion transfer between the electrodes. In a lead-acid battery, sulfuric acid is the electrolyte commonly employed.

A battery may be packaged in a plastic case for insulating purposes. However, the electrodes constitute the primary mechanical support and load-bearing means in current storage battery construction.

The glass fiber mat, now in use as a separator, has certain desirable features. It readily takes up and holds electrolyte, a property commonly referred to as wettability or wickability. It is also resistant to attack by the electrolyte, and provides acceptable electrical properties.

The fiber mat separator is, however, flexible and lacking in mechanical strength. This means that the electrodes, the casing, or other support members must be the primary source of structural integrity in a battery.

Batteries are commonly classified as either a flooded type or a starved, or sealed, type. In both types, the electrodes are compressed against the separator and held in that assembly. The porous coating on the metal grids, as well as the separator, become saturated with electrolyte. In the flooded type, the electrode and separator assembly is immersed in excess electrolyte so that the open space around the assembly is filled with electrolyte, e.g. sulfuric acid. In the starved, or sealed, type, the electrolyte is completely contained within the pores of the separator and electrode paste. In this construction, it is important that the electrolyte be retained in the pores to avoid leakage of the corrosive acid electrolyte.

Our related application describes a rechargeable battery assembly comprising a liquid electrolyte, spaced electrodes and a rigid, porous, ceramic separator between the electrodes. The separator is wettable by the liquid electrolyte, has a porosity of 40–90%, an average pore size of 0.1–25 microns, a thickness of 1–12 mm and a weight loss of less than 5% when refluxed in $H_2SO_4$ of 1.28 specific gravity for 72 hours at 70° C. While not so limited structurally, the separator of the related application is described as a thin, porous sheet of material with the pores dispersed in a substantially uniform matrix. The sheet may be cut from a gelled body, or an extruded ribbon, in sections of desired size.

The present invention provides a structural variation, or species, of the rigid, porous, ceramic separator depicted and described in the related application. The present separator provides electrical and physical properties that correspond to those provided by the uniform sheet, but that are improved in certain respects, in particular, effective porosity.

However, the present separator has distinctly different structural features and is produced by a different form of extrusion process. More particularly, the present invention employs die extrusion techniques to produce a rigid, porous, ceramic separator having a honeycomb structure. As shown subsequently, a separator of this unique structure can be adapted to use in either a flooded or a sealed type battery.

SUMMARY OF THE INVENTION

The product of our invention resides in an elongated, rigid, porous, ceramic separator for a rechargeable battery assembly, the separator having a honeycomb structure in which open cells are separated from adjacent cells by thin, porous, ceramic walls, the open cells and separating walls running lengthwise of the honeycomb separator, the cell walls being porous and the open cells and wall pores being adapted to be filled with an electrolyte to permit ion flow between electrodes in a battery.

The invention further resides in a method of producing a rigid, porous, ceramic separator for a rechargeable battery assembly that comprises forming an extrudable mixture of the ceramic material, or precursors thereof, extruding the mixture through a die designed to produce an elongated body having open cells running lengthwise with thin walls defining and separating the cells, and separating the elongated body into lengths suitable for separators.

BRIEF DESCRIPTION OF THE DRAWINGS

In the accompanying drawings.

PRIOR ART

Prior art considered to be of possible interest is supplied in an accompanying document.

DESCRIPTION OF THE INVENTION

Our invention adopts knowledge of honeycomb structure and production from unrelated arts. In particular, it adopts knowledge of honeycomb structures produced to function as catalyst substrates in catalytic converters for vehicular exhaust gases. It adapts such knowledge and structures to the construction of an improved rigid, porous, ceramic battery separator.

In producing gas converter substrates, it is common practice to extrude ceramic mixtures in continuous, elongated bodies sometimes referred to as logs. These extruded bodies may be composed of open cells running the length of the log. The cells are defined and separated by thin walls. Numerous die constructions have been devised to produce equally numerous log shapes. These include oval, round, rectangular and triangular shapes. Also, cell sizes varying from 2 to 2300 cells/sq. inch ($\equiv$ to 6.25 sq. cm.) of open face may be produced.

The present invention utilizes sections cut from honeycomb logs of the type used for converter substrates. It is based on our discovery that such honeycomb bodies, or sections cut therefrom, can be adapted to use as porous, ceramic separators. In fact, it has been found that proper selection of honeycomb structures provides a higher effective porosity, and hence superior battery performance, as compared to porous sheet ceramics.

Figure 1:
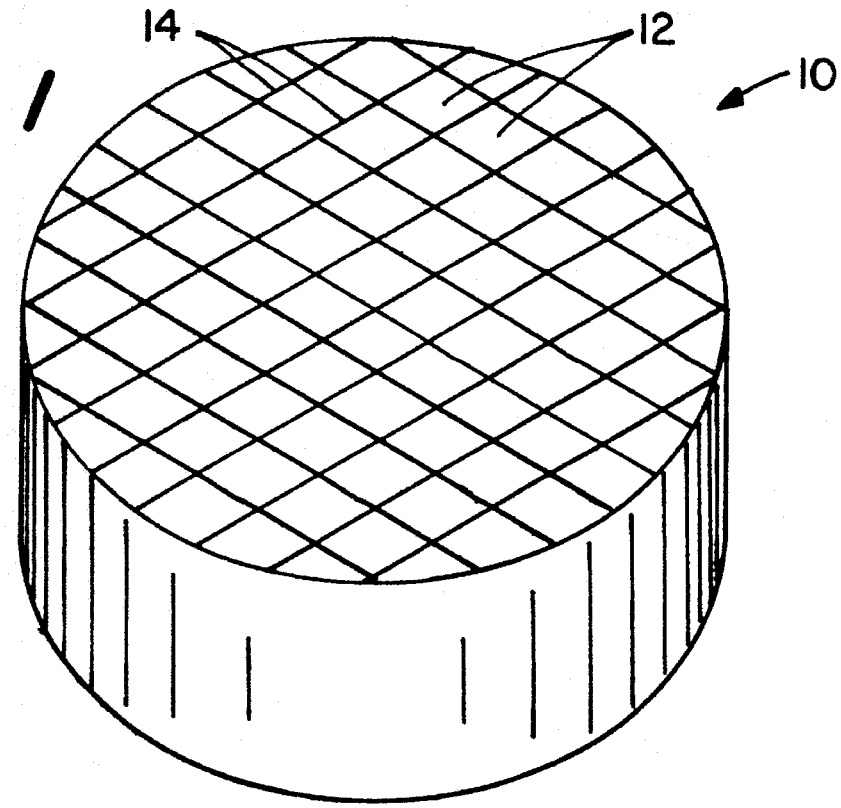
FIG. 1 is a perspective view of a typical honeycomb body used in producing a separator in accordance with the present invention.

FIG. 1 is a perspective view of a cylindrical, ceramic honeycomb body 10. Body 10 is conventionally produced by extruding a batch of suitable composition through a die such as disclosed in U.S. Pat. No. 3,905,743. It will be appreciated that dies can be constructed to extrude almost limitless different shapes. Generally, cylindrical bodies, such as shown in FIG. 1, are convenient to produce. Consequently, these have been used for development purposes.

Body 10 embodies open channels, or cells, 12 that run the length of body 10. Cells 12 are of uniform size throughout their length. For present purposes, cells 12 have a common size, that is, provide areal openings of equal size. The size is generally defined in terms of cells per unit area. For separator use, this may vary from 2 cells to 2300 cells per square inch ($\equiv$ to 6.25 sq. cm.). However, for effective porosity, as well as convenience of production, we prefer a cell size in the range of 400–800 cells per square inch.

Cells 12 are defined by thin walls 14 which surround each cell and separate it from adjacent cells. The thickness of walls 14 may be varied depending on the extrusion die employed, the nature of the batch extruded and the rate of extrusion.

In general, wall thickness decreases as the numbers of cells per unit area increase. A major factor to consider is structural integrity, that is, the fragility of the structure. As a general rule, cell size and wall thickness are relatively uniform throughout a body as a matter of both convenience in production and in battery performance. Wall thicknesses may vary with different honeycomb designs. They can range from about 1.5 mm (1/16") in the case of a few cells per unit area down to about 0.13–0.25 mm (5–10 mils) in the case of several hundred cells per unit area.

Figure 2:
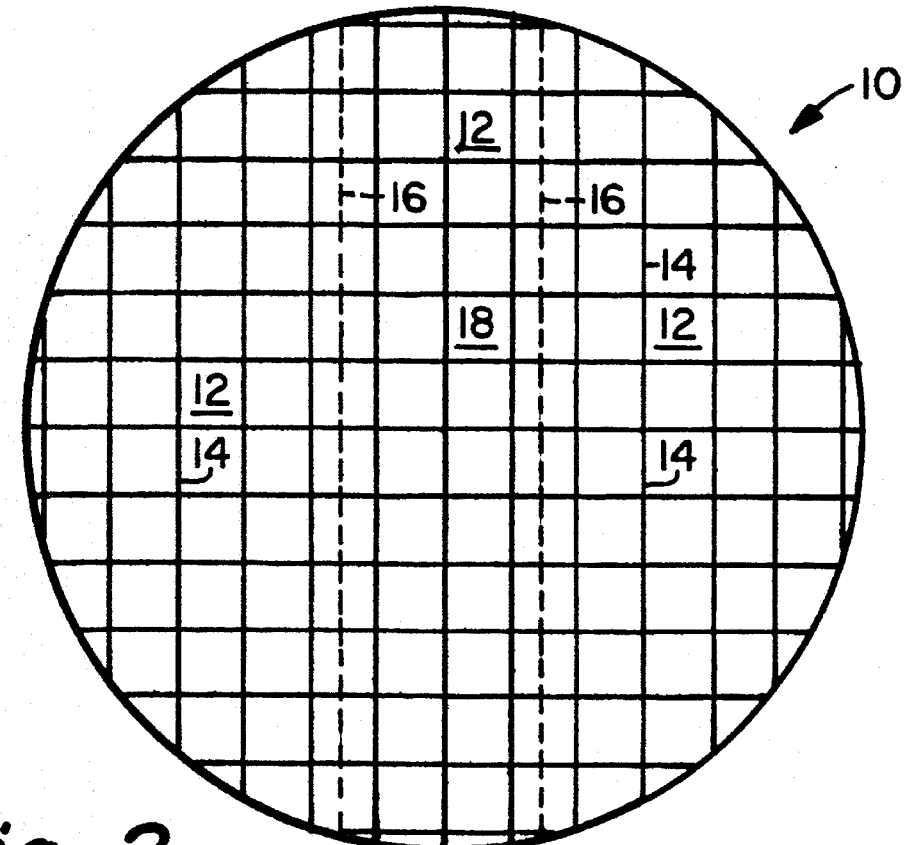
FIG. 2 is a top plan view of the body of FIG. 1.

FIG. 2 is a top plan view showing a preferred arrangement of equal size cells 12 and equal thickness walls 14 in body 10. As described in greater detail later, we have cut rectangular sections from body 10 for development of separators. FIG. 2 shows by dotted lines the cuts 16 made to produce a separator element 18 from body 10.

Figure 3:
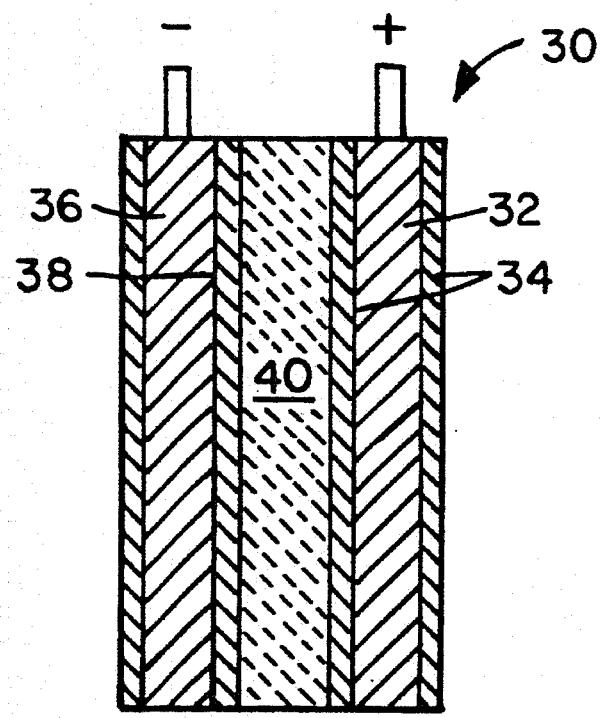
FIG. 3 is a side view in cross-section showing the typical construction of a single cell for a rechargeable battery.

FIG. 3 is a side view in cross-section showing the typical single cell construction in a rechargeable battery. It schematically illustrates the components of the cell and their arrangement. FIG. 3 shows a single cell 30. Cell 30 is composed of a metal grid 32 coated with a positive active paste coating 34, a metal grid 36 having a negative active paste coating 38, and a separator 40. Metal grids 32 and 36 are coated with their respective pastes and then pressed against the opposite faces of separator 40. Separator 40 will contain an electrolyte in its porous structure.

While not so limited, a battery separator is customarily a narrow rectangular sheet of material as shown in FIG. 3. It is a feature of the present invention that separator 40 has a honeycomb construction. In this structure, ion flow between electrodes 32 and 36 occurs transverse to the length of the honeycomb cells.

A suitable structure for separator 40 can be extruded employing a die having a rectangular cross-section. However, in our development, we have employed sections cut from a cylindrical honeycomb body such as shown in FIGS. 1 and 2. This practice is illustrated by cuts 16 in FIG. 2.

Figure 4:
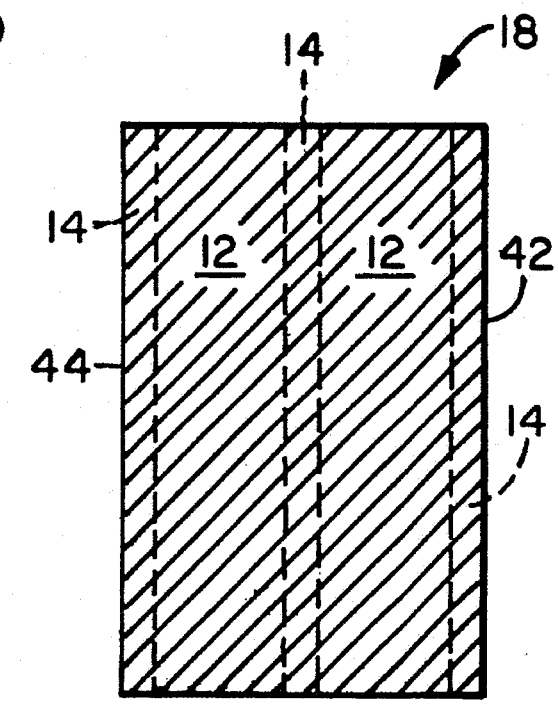
FIG. 4 is a side view of a section cut from the body of FIGS. 1 and 2 to function as a separator in accordance with the invention.

FIG. 4 is a side view in cross section of a separator element 18 cut from body 10 along lines 16. As shown, element 18 embodies cells 12 separated and defined by walls 14. In constructing a single cell battery, metal grids are paste coated to form electrodes. The coated grids are pressed against the long flat faces 42 and 44 of separator 18. When cell 30 is immersed in electrolyte, the electrolyte fills cells 12 and permeates the pores in walls 14 and the paste coatings. Current flow between the electrodes is via the electrolyte in the wall pores, the open cells and the paste coatings.

As a result, the effective porosity of separator 18 results from a combination of open cells 12 and walls 14. We have estimated this as being potentially in excess of 80%, a figure of 80% being used for convenience.

Battery cell 30 is highly satisfactory for use in a flooded cell type battery. There, the cell is immersed in, and surrounded by, electrolyte such as sulfuric acid. Without modification, however, cell 30 would be eminently unsatisfactory for use in a sealed type battery. It is evident that a liquid electrolyte would not be held in open cells 12.

Figure 5:
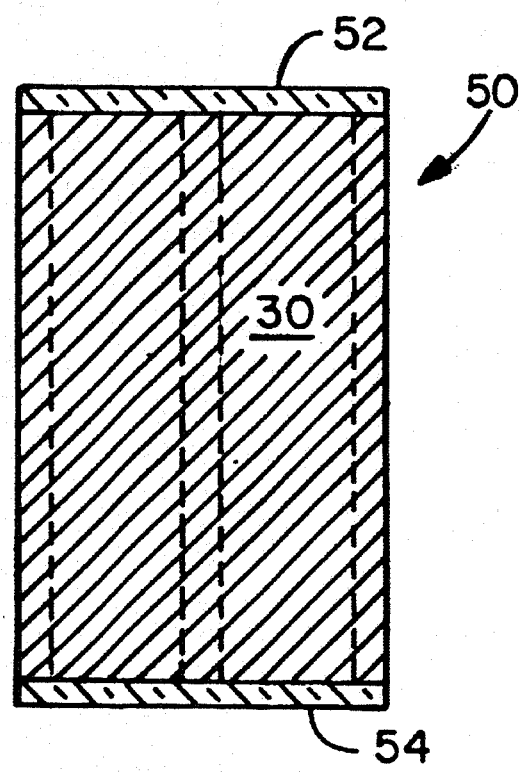
FIG. 5 is a top plan view of the honeycomb section of FIG. 4.

FIG. 5 is a side view in cross-section of a modified separator 50 in accordance with the invention. Separator 50 is designed to permit use of a honeycomb-derived, separator element in a sealed type battery. Separator 50 embodies an element corresponding to element 30 of FIGS. 3 and 4. This element is closed at either end by caps 52 and 54. This may be accomplished, for example, by sealing a layer of soft glass across the end of element 30. Alternatively, any solid plastic or porous ceramic that is insoluble in, and impervious to, the electrolyte may be used to cap the element ends.

In producing a battery, it is apparent that an electrolyte must be introduced into element 30 after the ends are capped. For this purpose, the element must be subjected to a vacuum while exposed to the electrolyte.

Figure 6:
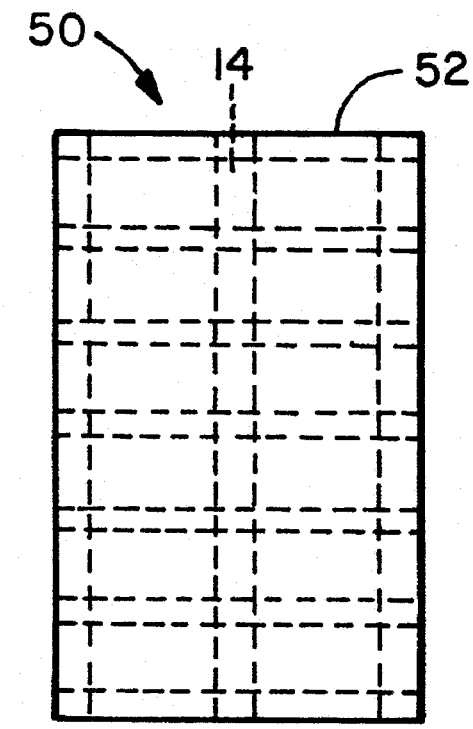
FIG. 6 is a modification of the separator shown in FIG. 4 that is designed for use in a sealed type battery.

FIG. 6 is a top plan view of element 30 of FIG. 5 with a transparent glass cap 52. Underlying cells and walls 12 and 14 are shown by broken lines.

A variety of features, or properties, are required in a battery separator. These include:

1. Sufficient porosity
2. Controlled electrical properties
3. Mechanical strength
4. Chemical durability
5. Wickability The porosity of a material involves both pore volume, pore size, and pore connectivity. Pore volume refers to the volume percent of the body occupied by pores. Connectivity is necessary for ion transfer between electrodes. It is adequate with the high pore volumes provided by the separators of this invention.

Too low a porosity fails to provide an adequately low internal resistance (impedance). In other words, the available voltage during discharge is reduced, and the voltage during formation is increased, to too great a degree. A porosity as high as is compatible with other factors, such as mechanical strength, is therefore preferred.

As indicated earlier, the effective porosity in a honeycomb separator represents the combined porosity effects of the open cells and the thin walls. The ceramic material in the walls has an inherent porosity of about 30–40%. However, a greater value is generally considered necessary to provide a sufficiently low impedance to produce a viable battery. A porosity greater than about 60% is preferred.

In order to enhance the porosity in an extruded ceramic, the batch prepared for extrusion may incorporate a combustible or evanescent filler in amounts up to about 75%. We prefer powdered graphite as the filler. When a body is extruded, it is fired to remove the filler, thereby enhancing the porosity value of the body. Combining this technique with the effect of a honeycomb structure provides an effective porosity that may be greater than 80%.

An electrical circuit, such as a battery, contains resistance (R), capacitance (C) and inductance (L). An impedance Z is defined to calculate the overall retarding effect on current of components with R, L or C. The impedance is critical to operation of a battery and expresses the system's slow response to a stimulus, namely the effect on current flow upon application of a stimulus (charging and discharging). Power (E in watts) in the alternating current (AC) mode of batteries is defined as the product of the current ($I_{ac}$ in amperes) and the impedance (Z in ohms) for the AC components of the battery only. Impedance invariably reduces the theoretical voltage of a battery to a lower working voltage.

Successful battery performance requires ability to accept and maintain a charge. To this end, the impedance value must be relatively low. During battery formation a total energy input is targeted in terms of a fixed ampere-hours/pound (Ah/lb). This input must occur with the voltage in any cell not exceeding a certain level. Normal practice is to provide a total energy input of 185 Ah/lb while maintaining the impressed voltage below 2.7 volts. If the porosity of a separator is too low, the impressed voltage will exceed the permissible limit. This necessitates cutting back the energy input level, a situation that interferes with proper formation of the battery.

The capacity of a cell is expressed as the total quantity of electricity involved in the electrochemical reaction. It is defined as the number of coulombs or ampere-hours (Ah). The potential ampere-hour capacity of a battery is directly associated with the quantity of electricity obtained from the active materials.

A further requirement is a minimum capacity level in ampere-hours during a discharge cycle. The discharge capacity is measured at a certain current and time required to reach a certain voltage. For example, a battery may be discharged at a current of 200–500 milliamperes for a predetermined time. Alternatively, the capacity may be determined in terms of the time required to reach a fixed voltage, e.g. 1.75 volts. Again, if the porosity is too low, and the consequent internal resistance too high, the capacity of the battery is reduced.

Our separator will take the form of a thin rectangular body so that thickness of the body is a factor to consider. The desire for small size and light weight must be balanced against the strength factor. Since the honeycomb structure tends to be fragile, it may require a greater thickness of at least 4 mm.

Other electrical properties of concern are consistency in cell performance and life time. The matter of consistency is of particular concern in large multicell batteries connected in series. There, the overall performance can be no better than that of the weakest cell. The inherent flexibility and lack of mechanical stability in glass fiber mat separators have contributed to erratic battery performance and life time.

The rigid separator of the present invention is particularly advantageous in respect of electrical stability. It resists warping or damage from handling or installation. It also resists flexing due to thermal expansion, since the expansion properties of ceramics are much lower than rubber polymers.

The significance of good mechanical strength has been noted relative to electrical stability. It is also an important factor in battery production. A rigid separator that has sufficient strength to permit automated assembly has the potential to generate considerable cost reduction.

Chemical durability is necessary since the separator is exposed to the electrolyte. The industry test used for a lead-acid battery separator involves exposure of the material to sulfuric acid solution of 1.28 specific gravity for 72 hours at 70° C. The material must exhibit a weight loss that is less than 5% to be acceptable. For convenience in coordinating testing, we have adopted a more stringent test that involves exposure to 40% sulfuric acid for 96 hours at 95° C. Further, we have required that weight loss in this more stringent test not exceed about 2%.

Finally, a porous material must have good wickability. This is a measure of the ability for the pores to take up electrolyte by capillary action. For example, a glass fiber mat separator typically will allow a sulfuric acid electrolyte to rise to a height of 7.5 cm (3") in a period of 3 minutes. It is apparent that the combination of open cells and thin walls in our honeycomb, ceramic separator facilitates wickability. Actually, wicking rates equal to those presently characteristic of commercial glass mats may be obtained.

Our preferred ceramic materials for honeycomb separator purposes are composed of alumina or mullite alone or mixed with each other. Sources of these materials in powder form are mixed with methylcellulose, a dispersant and water to form extrudable mixtures. The mixtures are extruded in ribbon form having a desired thickness, and are fired to produce test samples.

The resulting bodies generally have porosities on the order of 40%. In order to increase these porosity values, the compositions prepared for extrusion are mixed with graphite filler in amounts up to 75%.

SPECIFIC EMBODIMENTS

Development work has been largely carried out with our preferred materials, extruded alumina/mullite mixtures.

These materials have been mixed with graphite prior to extrusion. As noted earlier, the graphite burns out of the extruded material to provide bodies with improved porosities.

TABLE I shows batch compositions in parts by weight for a series of mixtures which, when extruded and fired, provide bodies composed of 33% mullite and 67% alumina.

TABLE I

| Batch Materials | 1 | 2 | 3 | 4 | 5 | 6 | 7 |
|---|---|---|---|---|---|---|---|
| Platelet clay | 16.66 | 14.13 | 11.63 | 9.14 | 7.80 | 5.82 | 4.16 |
| Stacked clay | 5.54 | 4.71 | 3.88 | 3.05 | 2.49 | 1.94 | 1.39 |
| Calcined clay | 27.61 | 23.47 | 19.34 | 15.19 | 12.42 | 9.66 | 6.90 |
| Alumina | 50.73 | 42.67 | 35.16 | 27.63 | 22.60 | 17.58 | 12.56 |
| Graphite | — | 15 | 30 | 45 | 55 | 65 | 75 |
| Methyl cellulose | 3 | 3 | 3 | 3 | 3 | 3 | 3 |
| Dispersant | 0.7 | 0.7 | 0.7 | 0.7 | 0.7 | 0.7 | 0.7 |
| Water | 27.5 | 27.5 | 27.5 | 27.5 | 27.5 | 27.5 | 27.5 |

The basic batches, prior to addition of graphite, were originally designed for preparation of support substrates exposed to temperature cycling. Accordingly, combinations of platelet, stacked and calcined clays (kaolin) were employed to control expansion effects by crystal orientation. The thermal expansion effects of the different clays, not of significance here, are explained in detail in U.S. Pat. No. 3,885,977 (Lachman et al.)

TABLE II shows batch compositions in parts by weight for a similar series of materials which, when extruded and fired, produce alumina bodies of varying porosity.

TABLE II

| Batch Materials | 8 | 9 | 10 | 11 |
|---|---|---|---|---|
| Alumina | 100 | 75 | 50 | 25 |
| Graphite | — | 25 | 50 | 75 |
| Methyl cellulose | 3 | 3 | 3 | 3 |
| Dispersant | 0.7 | 0.7 | 0.7 | 0.7 |
| Water | 27.5 | 27.5 | 27.5 | 27.5 |

TABLE III shows properties for the fired porous bodies produced from the batches shown in TABLES I and II.

TABLE III

| Example | MOR Mpa (psi) | Porosity (%) | Pore Size (Microns) |
|---|---|---|---|
| 1 | 51.2 (7400) | 40.4 | 0.49 |
| 2 | 27.6 (4010) | 50.7 | 0.60 |
| 3 | 14.9 (2160) | 58.6 | 1.17 |
| 4 | 6.7 (973) | 68.6 | 3.88 |
| 5 | 3.0 (431) | 72.5 | 5.30 |
| 6 | 1.75 (253) | 76.8 | 6.64 |
| 7 | 1.6 (232) | 82.1 | 8.43 |
| 8 | 28.7 (4180) | 40.3 | 1.07 |
| 9 | 7.4 (1080) | 57.1 | 1.91 |
| 10 | 3.1 (456) | 60.2 | 10.21 |
| 11 | <0.7 (<100) | 85.0 | 13.93 |

A set of 3-cell batteries was produced for cycle life testing. The test was designed to continue through 100 cycles.

The batteries were constructed as described above employing standard lead-acid battery components, except for the separators. The separators for the batteries were produced by extruding test pieces from a batch corresponding to that shown as Example 2 in TABLE I above.

The separators were prepared by formulating an extrusion batch based on the composition of Example 2. This batch was extruded into a 7.6×7.6 cm (3×3"), cylindrical honeycomb log with 600 cells/inch$^2$. The walls were on the order of 4–6 mils thick. The extruded log was then fired to burn out the graphite filler.

Rectangular sections were cut lengthwise from the interior of the log in the manner illustrated in FIG. 3. These sections had rectangular dimensions of 5×5 cm (2×2") and 5×10 cm (2×4") and a thickness of 4 mm. Continuous open cells ran from one end to the opposite end of the section. Each battery employed 7 cm×4.5 cm (2¾"×1¾") separators. The thickness was 4 mm. Also, two commercial batteries having glass fiber mat separators with porosities of about 90% were prepared for testing as a benchmark or standard. The effective porosity of the extruded separators was taken as 80%.

The cells thus prepared were formed by charging at 2.5 volts; placed at 2.3 volts for 30 minutes; and open circuited for a minimum of one hour. The AC impedance was measured with a H/P 1000 cycle milliohmmeter and the open circuit voltage measured.

The cycling test was then initiated on all batteries. This consisted of discharging the battery at 1.2 amperes to an end voltage of 1.75 volts. The discharged battery was then recharged to 120% of the cell with the highest ampere-hour output. This cycle was continued 100 times.

The lead/acid cells assembled with the mullite/alumina extruded honeycomb separators displayed uniform capacity and voltage parameters through the 100 cycles of charge/discharge cycling. In contrast, the control cells with the commercial glass mat separators displayed considerably greater deviations in both respects. They also had to be cut back in discharge voltage after about 50 hours. This indicated an effective life time of about half that of the batteries with the mullite/alumina separators.

TABLE IV compares certain relevant properties of batteries constructed with different separators. A battery with an extruded honeycomb alumina/mullite separator is compared with a battery having an extruded sheet type separator, and with the benchmark batteries having commercial glass mat separators with a porosity of about 90%.

The extruded sheet was prepared from a batch having the composition of Example 2, and had a porosity of about 50%.

TABLE IV

| | Honeycomb | Sheet | Glass mat Control |
|---|---|---|---|
| Voltage (V) | 2.1 | 2.1 | 2.1 |
| Impedance (Ω) | 16 | 2.3 | 17 |
| Current Capacity (Ah-50 cycles) | 5.25 | 4.65 | 4.85 |
| Current capacity (Ah-100 cycles) | 4.95 | 4.30* | 4.30* |
| Power density (Wh/kg) | 49 | 44 | 45 |

*No deep discharge after 50 cycles.

Figure 7:
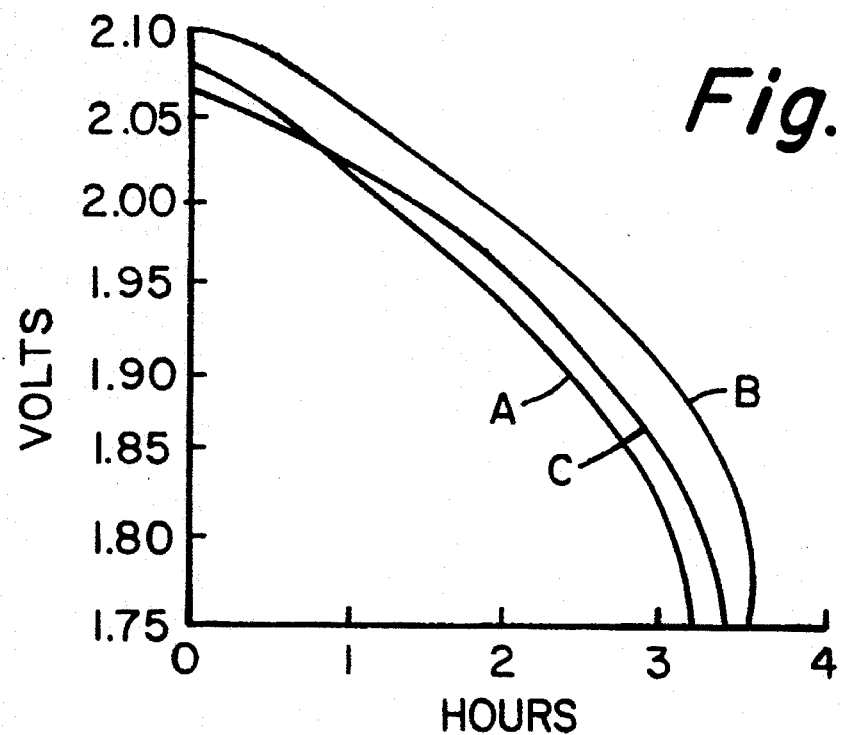
FIGS. 7 and 8 are graphical illustrations of properties exhibited by batteries in accordance with the invention.

FIG. 7 is a graphical representation of performance in three batteries of essentially the same construction, except for the porous separator. Cell voltage is plotted on the vertical axis. The times in hours to discharge to the cutoff point of 1.75 volts are shown by the intercepts on the horizontal axis.

The curve labeled A represents the rate of discharge for a battery with a mullite-alumina, extruded, sheet-type separator having a 50% porosity. Curve B represents the rate of discharge for a battery having a honeycomb-type, extruded separator, with an effective porosity of about 80%. Curve C illustrates the discharge rate for a battery with a glass fiber separator having a reported porosity of about 90%. The longer discharge time represented by curve B illustrates the significantly better performance of a battery with a honeycomb separator.

Figure 8:
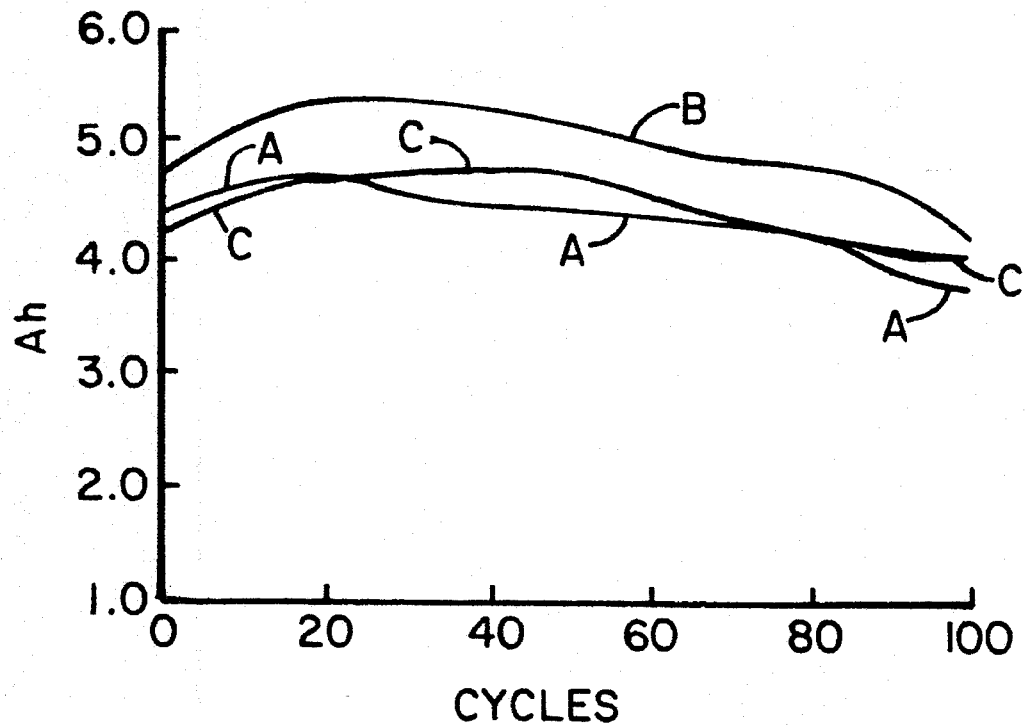

FIG. 8 is also a graphical representation in which performance of the same batteries is compared in a different manner. In FIG. 8, discharge-recharge cycles are plotted on the horizontal axis and battery capacity, in ampere-hours, is plotted on the vertical axis.

Curve A again represents the battery having an extruded, mullite-alumina separator of the sheet type with a porosity of 50%, Curve B represents the battery having an extruded separator of the honeycomb type with an effective porosity of about 80%. Curve C represents performance of the battery with the commercial, glass fiber separator. It will be observed that Curve B again demonstrates significantly better performance in this comparison as well.

We claim:

1. A rechargeable battery assembly comprising an electrolyte, spaced, external electrodes and a separator between the electrodes, the separator being an elongated, thin honeycomb structure composed of open cells separated from adjacent cells by thin, porous, ceramic walls, the open cells and separating walls running lengthwise of the honeycomb structure, the honeycomb structure having opposed outside faces to which the electrodes are attached, the outside faces on the honeycomb and the electrodes attached thereto being parallel with the open cells and porous walls of the honeycomb structure, the open cells and wall pores of the separator containing the electrolyte whereby ion flow occurs between the electrodes, the ion flow being transverse to the length of the honeycomb.

2. A battery assembly in accordance with claim 1 wherein the porosity in the wall sections of the separator is over 40%, the separator thickness between electrodes is at least 4 mm and the honeycomb has 2–2300 cells per square inch.

3. A battery assembly in accordance with claim 2 wherein the porosity in the wall sections of the separator is at least 50%.

4. A battery assembly in accordance with claim 2 wherein the honeycomb has 400–800 cells per square inch.

5. A battery assembly in accordance with claim 1 wherein the separator ceramic is selected from the group composed of alumina, mullite and alumina-mullite mixtures.

6. A battery assembly in accordance with claim 5 wherein the ceramic is a mixture of alumina and mullite.

7. A battery assembly in accordance with claim 1 wherein the cell wall thickness is at least 0.13 mm (5 mils).

8. A battery assembly in accordance with claim 1 wherein the open cells and separating walls of the honeycomb are uniform in cross-section size.

9. A battery assembly in accordance with claim 1 wherein the battery is a sealed type and the open face at either end of the separator is capped to prevent outward flow of electrolyte from the separator.

10. A battery assembly in accordance with claim 9 wherein the ends of the separator are capped with a thin vitreous or ceramic layer.

11. A battery assembly in accordance with claim 1 wherein the effective porosity transversely of the separator is at least 60%.

12. A battery assembly in accordance with claim 11 wherein the effective porosity transversely of the separator is at least about 80%.

13. A battery assembly in accordance with claim 1 wherein the battery is a flooded type.

14. A method of producing a battery cell which comprises extruding a mixture of ceramic material precursors through a die designed to produce an elongated body having open cells running lengthwise of the body with thin walls defining and separating the cells, cutting a section from the extruded, elongated body having the length of a ceramic separator and having opposed faces parallel with the open cells, applying electrodes to the opposite, lateral faces of the separator section, and introducing an electrolyte into the open cells and wall pores, whereby ion flow occurs transversely through the separator section between the electrodes.

15. A method in accordance with claim 14 which comprises extruding a continuous ribbon having the cross-section shape of the separator and cutting the ribbon into sections having the length of the separator and having opposed lateral faces for electrode attachment.

16. A method in accordance with claim 14 which comprises extruding a continuous body of cross-section greater than the separator, cutting sections having the length of the separator and trimming these sections to the separator shape to provide opposed lateral faces for electrode attachment.

17. A method in accordance with claim 16 wherein the sections are trimmed to a rectangular shape.

* * * * *